United States Patent [19]

Briggs et al.

[11] Patent Number: 5,066,431

[45] Date of Patent: Nov. 19, 1991

[54] METHOD OF MAKING TORIC CONTACT LENSES

[76] Inventors: Charles R. Briggs, 6815 Academy Parkway West, NE., Albuquerque, N. Mex. 87109; Charles W. Neefe, 811 Scurry St., Big Spring, Tex. 79720

[21] Appl. No.: 511,784

[22] Filed: Apr. 20, 1990

[51] Int. Cl.$^5$ .............................................. B29D 11/00
[52] U.S. Cl. ...................................... 264/2.1; 264/1.4; 425/808
[58] Field of Search .................... 264/2.1, 1.4; 425/808

[56] References Cited

U.S. PATENT DOCUMENTS

| | | | |
|---|---|---|---|
| 4,022,855 | 5/1977 | Hamblen | 264/2.1 |
| 4,422,984 | 12/1983 | Nufe | 264/2.1 |
| 4,806,287 | 2/1989 | Sule et al. | 264/2.1 |

FOREIGN PATENT DOCUMENTS 70617  5/1982  Japan ..................... 264/2.1

Primary Examiner—James Lowe

[57] ABSTRACT

The invention relates to a method of spin casting lenses having optical surfaces which may be spherical, aspherical or toric in shape. The method provides a concave optical mold having a spherical, aspherical or toric optical surface. A convex optical mold having a spherical, aspherical or toric surface is also privided. A selected liquid lens monomer with a selected catalyst is placed in the concave lens mold. The convex optical mold is positioned in the concave mold displacing the liquid lens monomer. The optical axis of the concave and convex molds are aligned and the two molds rotated about their concurrent optical axis. The liquid monomer is allowed to polymerize forming a solid polymer lens. The finished lens is then removed from the molds.

9 Claims, 2 Drawing Sheets

METHOD OF MAKING TORIC CONTACT LENSES

This invention relates to a method of preparing corneal contact lenses and more particularly toric contact lenses essentially consisting of soft hydrogels of organic polymers.

Difficulties were encountered heretofore in the manufacture of toric contact lenses from soft polymeric hydrogels. The polymerized material is too soft when in the swollen state to permit surface finishing, and brittle when dried. It is necessary that contact lenses be made from the hydrogels by polymerizing a suitable starting material in a mold whose surface configuration determines the lens surface.

The art of spin casting contact lenses has been in use for over twenty years. The principle value of spin casting is its low cost and high production. The disadvantages are the lenses are not spherical and the aspheric surface is of a shape that increases spherical aberration. The exact shape is most difficult to describe due to its being formed by several forces including centrifugal force, surface tension, viscosity of the liquid and radius of the concave mold.

In spin casting the two optical surfaces of the lens are formed simultaneously during polymerization. The outer lens surface is shaped by contact with the smooth mold surface, and the inner lens surface is shaped by the joint action of centrifugal forces, gravity and of surface tension on the polymerization mixture. Since the mold diameter is normally between 8 and 14 millimeters, the influence of surface tension on the ultimate lens shape is quite substantial.

The instant invention is concerned with a method and apparatus for making contact lenses which may have concave surfaces other than approximately paraboloidal surfaces. A more specific object of this invention is the provision of a method and of apparatus for preparing soft and resilient contact lenses having the necessary toric concave configuration for correcting astigmatism. Contact lenses suitable for this purpose were heretofore prepared by grinding and polishing a blank consisting of a hard transparent xerogel polymer and hydrating to form the soft and resilient hydrogels of sparingly cross-linked synthetic polymers which have many known advantages over the hard plastic lenses.

PRIOR ART

Wichterle U.S. Pat. No. 4,256,369 describes a soft toric contact lens having a menescus concave surface and a toric convex lens surface which is molded against a toric concave mold.

Neefe U.S. Pat. No. 4,179,484 describes a method of making toric lenses having a molded toric concave surface and a lathe cut and polished spherical convex surface.

Wichterle U.S. Pat. No. 3,361,858 describes a method of molding lenses and removing the swelling agent before shaping the xerogel lens and rehydrating to form a toric hydrogel lens.

Neefe U.S. Pat. No. 4,541,969 describes a method of making toric soft lenses by tilting the mold synchronized with the rotation.

Neefe U.S. Pat. No. 3,380,718 describes a method of molding a convex and concave optical surface without the use of seals.

STATE OF THE ART

In a lens mold having its rotational axis toward the earth's center the equation for the spinning liquid surface can be expressed in a cylindrical coordinate system as:

$$z(r) = \frac{w^2 r^2}{2g} + \frac{o}{pg}\left[\frac{1}{R_s} + \frac{1}{R_1}\right]$$

where,
w is rotational speed in radians per second,
g is gravitational acceleration,
0 is surface tension,
p is liquid density,
$R_s$ is surface sagittal radius of curvature and
$R_1$ is surface tangential radius of curvature.

Soft spin cast lenses cannot provide acceptable vision to patients having 1.00 diopter or more cornea astigmatism. This is because soft lenses conform to the curvature of the cornea and the corneal astigmatism is then present on the convex surface of the soft contact lens. Hard rigid lenses do not conform to the shape of the cornea and the tear layer between the spherical lens and the toric cornea neutralizes the corneal astigmatism. This desirable effect does not occur with soft contact lenses. The present invention discloses a method of spin casting lenses with a toric concave surface to match toric convex corneal surface and neutralize the corneal astigmatism.

DESCRIPTION OF THE PREFERRED EMBODIMENT

The lenses are cast of a selected lens monomer such as flurocarbon methylmethacrylate, Hydroxyethylmethacrylate or silicone. The monomer is copolymerized with additives such as cross-linkers to improve the quality of the finished lenses. A Catalyst is added to control the time required for polymerization. Typical examples of these mixtures are:

| | | |
|---|---|---|
| (1) | Ethylene glycol monomethacrylate | 64.8% |
| | Diethylene glycol monomethacrylate | 7.056% |
| | Ethylene glycol dimethacrylate | 0.144% |
| | Water | 20.9% |
| | Ammonium persulfate | 1.1% |
| | 2-dimethylaminoethyl acetate | 6.0% |
| (2) | Ethylene glycol monomethacrylate | 54.7% |
| | Diethylene glycol monomethacrylate | 17.2% |
| | Diethylene glycol dimethacrylate | 0.6% |
| | Ammonium persulfate | 1.1% |
| | Dimethylaminoethyl acetate | 5.8% |
| | Water | 20.6% |
| (3) | Methylmethacrylate | 96.75% |
| | Ethylenedimethacrylate | 3.00% |
| | Benzoyl Peroxide | .25% |

The application of heat to the molds will reduce further the time required for polymerization. Photo sensitive catalysts may be used with transparent outer molds and ultraviolet light may reduce the time required for polymerization without the application of heat.

Figure 1:
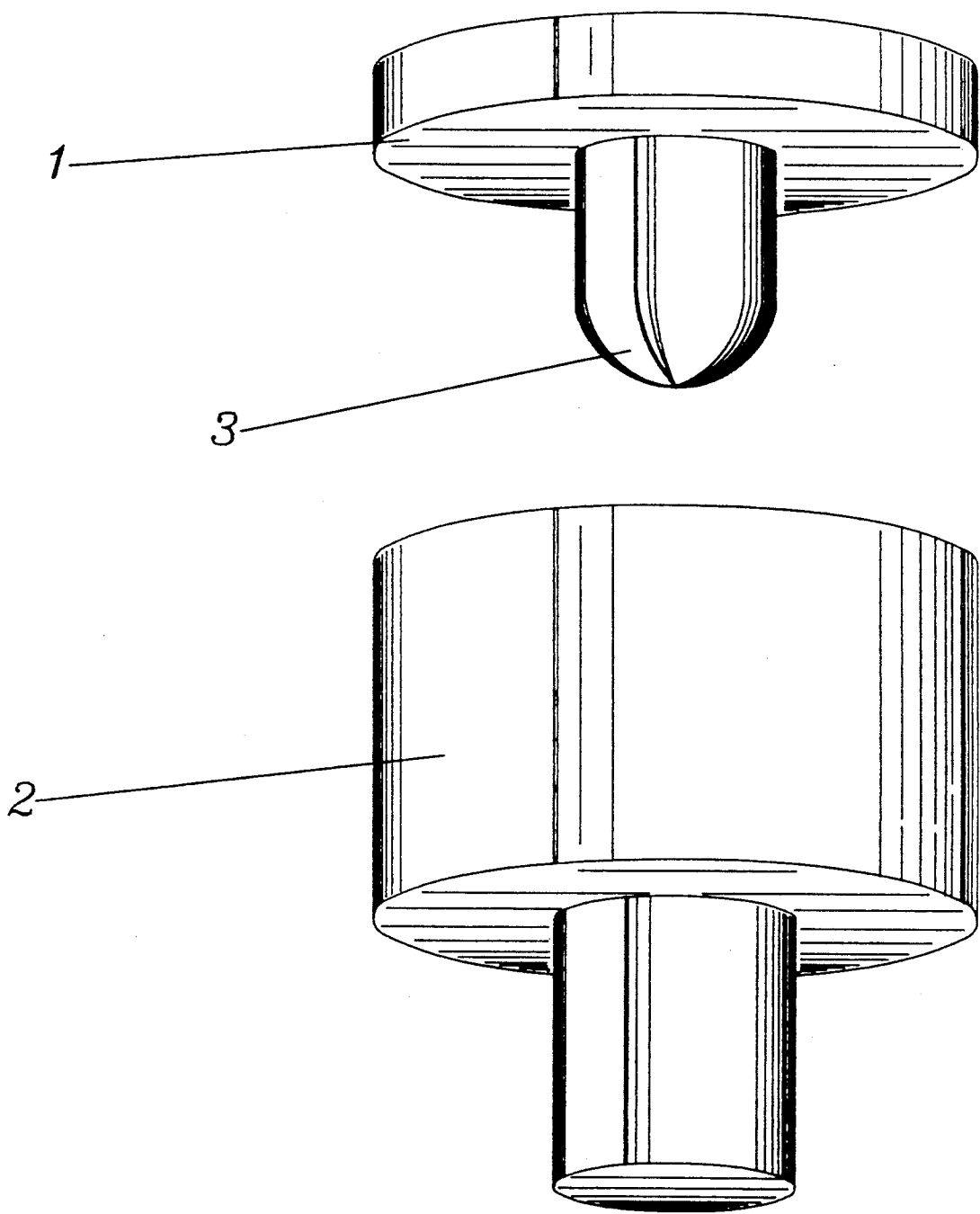
FIG. 1 shows the concave and convex molds.
Figure 2:
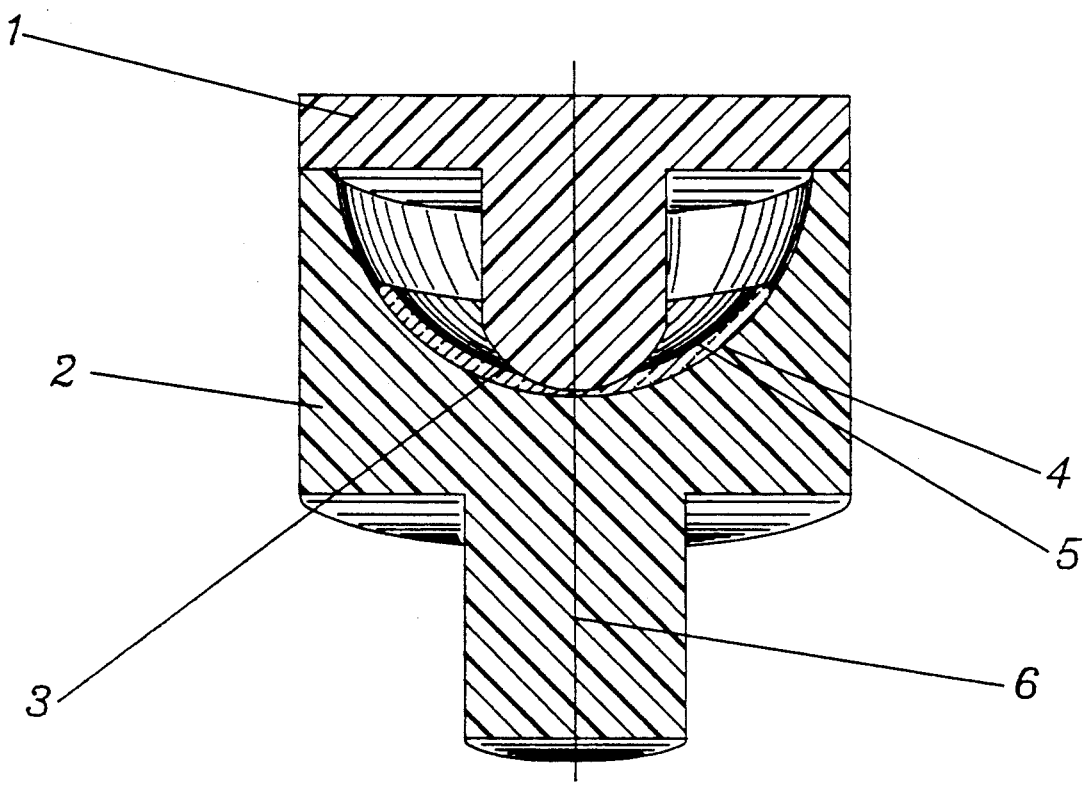
FIG. 2 shows the concave and convex mold assembled in section.
Figure 3:
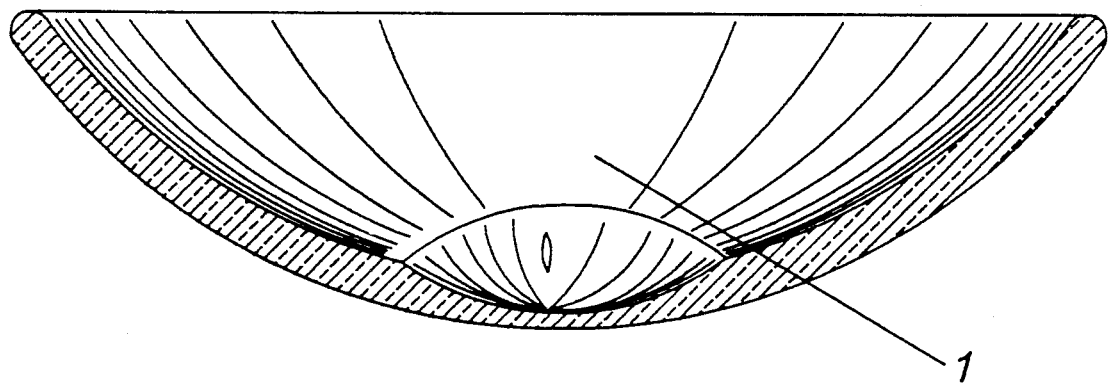
FIG. 3 shows the finished lens in section.

The Method Is Carried Out As Follows:

A concave mold 2 FIG. 1 and 2 having a concave optical surface 4 FIG. 2 is provided. The concave optical surface 4 FIG. 2 may be spherical, aspherical or toric in configuration. A second convex mold member 1 FIGS. 1 and 2 is provided. The second convex optical mold member may be spherical, aspherical or toroidal. The selected monomer with a selected catalyst is placed in the concave optical mold 2 FIG. 1 and 2. The convex optical mold surface 3 FIGS. 1 and 2 is placed in the liquid monomer displacing the liquid monomer 5 FIG. 2. The convex mold 1 FIG. 2 is aligned with the concave mold 2 FIG. 2. This alignment is required to eliminate prism from the finished lens. The optical axis of the concave optical surface 4 FIG. 2 and the optical axis of the convex optical surface 3 FIG. 2 must concur. The assembled molds are rotated about the common optical axis 6 FIG. 2 directed toward the earth's gravitational center. The spinning liquid monomer is allowed to polymerize forming a solid lens member 5 FIG. 2 between the concave optical mold 4 FIG. 2 and the convex optical mold 3 FIG. 2. Heat or ultraviolet light may be employed to accelerate polymerization. The finished lens 1 FIG. 3 is removed from the molds.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of making spin cast lenses having a toric central area by the steps of, providing a concave optical mold having a spherical concave optical surface, placing a selected liquid lens monomer in the concave spherical lens mold, placing a convex toric optical mold in the central area of the convex spherical mold thereby displacing the central liquid lens monomer, aligning the optical axis of the concave and convex optical lens molds, the assembled molds are rotated about the common optical axis directed toward the earth's gravitational center forming a spin cast peripheral lens, allowing the liquid lens monomer to polymerize forming a solid lens having a toric central area and a spin cast peripheral, removing the finished lens from the molds.

2. A method as in claim 1 wherein the convex mold is aspheric.

3. A method as in claim 1 wherein the concave mold is aspheric.

4. A method as in claim 1 wherein the concave mold is spherical.

5. A method of making toric spin cast lenses by the steps of, providing a concave optical mold having a toric concave optical surface, placing a selected liquid lens monomer in the concave toric lens mold, placing a convex spherical optical mold in the central area of the convex toric mold thereby displacing the liquid lens monomer, aligning the optical axis of the concave and convex optical lens molds, the assembled molds are rotated about the common optical axis directed toward the earth's gravitational center, allowing the liquid lens monomer to polymerize forming a solid lens having a molded central area and a spin cast periphery removing the finished lens from the molds.

6. A method as in claim 5 wherein the convex mold is aspheric.

7. A method as in claim 5 wherein the concave mold is aspheric.

8. A method as in claim 5 wherein the concave optical mold is spherical in shape.

9. A method as in claim 5 wherein the convex optical mold is toric in shape.

* * * * *